United States Patent [19]
Gay

[11] 4,018,051
[45] Apr. 19, 1977

[54] OMNIDIRECTIONAL AIR DRIVEN POWER GENERATING SYSTEM

[76] Inventor: David Gay, c/o Mr. W. S. Lewis, 80, Church Lane, Sale, Cheshire M33 5QG, England

[22] Filed: Apr. 22, 1976

[21] Appl. No.: 679,508

Related U.S. Application Data

[63] Continuation-in-part of Ser. No. 583,530, June 4, 1975, abandoned.

[52] U.S. Cl. .................................. 60/398; 60/407; 290/55; 415/2
[51] Int. Cl.[2] .......................................... F03D 3/04
[58] Field of Search ............ 60/325, 327, 370, 398, 60/407; 290/44, 55; 415/2, 3, 4; 417/330

[56] References Cited

UNITED STATES PATENTS

| 129,567 | 7/1872 | Jones | 60/407 |
|---|---|---|---|
| 969,587 | 9/1910 | Williams | 415/4 X |
| 3,707,812 | 1/1973 | Roessl | 290/55 |

FOREIGN PATENTS OR APPLICATIONS

| 1,025 | 1/1909 | United Kingdom | 415/4 |

Primary Examiner—Edgar W. Geoghegan
Attorney, Agent, or Firm—Watson, Cole, Grindle & Watson

[57] ABSTRACT

The omnidirectional air driven power generating system is a system of valves and chambers which translate the potential energy of an air pressure differential into kinetic energy in the form of a compact air current of accelerated velocity. The valves relieve overpressure and assure one-way flow through an air driven power converter, regardless of the direction of the wind. The pressure differential is created across any convenient structure such as a house, church, cliff or mountain. A simple cruciform structure is disclosed which optimizes the pressure differential. There is no limit to the size or weight of the deflecting surfaces, and the power producing potential of the system increases as the projected frontal area which is exposed to the wind increases. The rotors of the air driven power converter are enclosed within a housing which provides a sheltered environment such that operation at its rated output power can continue through any extreme of wind or turbulence.

14 Claims, 5 Drawing Figures

OMNIDIRECTIONAL AIR DRIVEN POWER GENERATING SYSTEM

CROSS-REFERENCE TO RELATED APPLICATION

This application is a continuation-in-part of my earlier filed copending application, Ser. No. 583,530, filed June 4, 1975, now abandoned.

BACKGROUND OF THE INVENTION

This invention is related generally to devices which convert the energy of wind currents to more usable forms and is more particularly concerned with such devices which are capable of such conversion at high efficiencies and at low cost.

Recently, the world has been confronted with the fact that with rapidly advancing industralization and technology the fossil fuel energy sources in the world are being depleted at an increasingly rapid rate. As a result, renewed emphasis is being placed on efforts to derive usable quantities of energy from other sources, such as nuclear fuels and solar energy.

A fluid current, such as an air current or wind, possesses kinetic energy in a quantity which is a function of its mass and velocity. If the current is deflected from its original path, the object causing the deflection is subjected to a force which is a function of numerous factors. For the purpose of this discussion, the most important of these factors are the area of the surface causing the deflection, and the severity or degree of deflection it causes.

Basically, all conventional windmills employ this principle through aerodynamic reactions which cause pressure differentials across the surfaces of their airfoil blades. However, as stated above, the force available for conversion to other energy forms is a function of the area of the deflecting surface and the degree of deflection. The degree of deflection may be roughly equated to the efficiency of the windmill. This eventually reaches a maximum value. Thereafter, any attempt to further increase the power recovering capability of the windmill requires either an increase in the area of its airfoil surfaces, or an increase in the kinetic energy of the air current.

If airfoil area is to be increased, the blades may be widened to a certain extent; but, eventually, the blades must also be lengthened to increase the frontal area of the windmill and to gain exposure to the kinetic energy of a larger mass of air in the current. Unfortunately, as the length of a rotating blade increases radially, the blade becomes increasingly subject to a variety of structural, dynamic, and operational problems.

For a given rotational speed, the linear speed at the blade tip may become excessive for efficient aerodynamic reaction. This may be corrected by reducing the working rotational speed; however, this produces two additional problems. The rate of input of work to the windmill shaft is reduced, and, due to the disparity in linear velocity over the long span of the blade, the root area may now be operating in or near an aerodynamically stalled condition. Furthermore, since most power converting devices which the windmill might drive require relatively high cranking speeds, some form of step-up gearing must be employed thereby, adding friction, weight and complexity to the windmill system and further reducing its efficiency.

Structurally, if a blade is to be of increased length, yet be aerodynamically practical, it must present large, effectively planar surfaces. Winds of higher than average velocity represent the most productive environment, but such winds acting upon the blade configuration just described are likely to create intolerable stress concentrations, bending, and dynamic flutter. Therefore, a definite structural limitation is also imposed on conventional windmill performance.

For the purpose of the present disclosure, the elementary discussion given above establishes that above a certain swept diameter, the conventional windmill suffers penalties of efficiency and utility if its blade length is increased in an effort to obtain greater power recovering capability.

Winds of greater velocity obviously possess greater amounts of kinetic energy. Such winds are regularly available at higher altitudes, and access to such altitudes is granted by peaks, cliffs, and escarpments. However, such sites are also subject to seasonal extremes of turbulence, precipitation and temperature. If the rotor, weathervane pivot, and mounting tower of a conventional windmill are designed for an average condition, they are too fragile for the extreme conditions. If the rotor can withstand the extreme conditions, it is likely to be inoperative in mild conditions unless a complex feathering mechanism is provided. In short, the spectrum of useful wind velocities of the conventional windmill is very limited.

At an earlier point in time, considerable efforts were made to improve on these operational limitations of windmills. One such scheme is shown in British patent specification No. 1025 of 1908. The wind machine there disclosed has a plurality of regularly spaced outwardly extending baffles arranged around a central air driven turbine wheel. The baffles form increasingly constricted nozzles as they approach the turbine wheel thereby accelerating the air current to drive the turbine wheel. The air is then exhausted from the top of the machine.

Two problems prevent such a device from being feasibly efficient today for power conversion. Firstly, for the device to operate, a pressure differential must exist across the turbine wheel and its magnitude is directly proportional to the output power which can be produced. In this machine, the pressure differential which can exist between a side and a minor depression on the top is minimal. Secondly, only those baffle openings facing into the wind are able to collect air from the currents to accelerate toward the turbine wheel. At best, less than one-half of the blades on the turbine wheel are having positive pressure applied to them at any given time. The remainder of the turbine wheel blades are effectively acting as turbine compressor blades since they are rotating in nearly ambient pressure air. These unused blades are, therefore, wasting output torque.

A second approach is shown in U.S. Pat. No. 969,587. This wind machine houses an air driven turbine in a hollow cylindrical structure. At the opposite ends of the structure manually movable wings are employed for deflecting wind currents into the cylindrical structure to drive the turbine. The device is, however, relatively efficient when the wind is directed generally parallel to the cylinder axis. Orthogonally directed winds cannot be captured to any significant extent even by moving the deflecting wings. Furthermore, the device is not capable of self adjustment so that it cannot be left unattended for long periods of time. Also, the air flow direction through the turbine reverses direction with changes in wind direction. This necessitates reversible pitch blades on the turbine which are costly and generally fragile. Hence, this device is also wholly unsuitable for a modern energy conversion system.

SUMMARY OF THE INVENTION

It is, therefore, an object of the present invention to provide a novel air driven power generating system which overcomes many of the disadvantages of the prior art.

A second object of the invention is to provide a structure which when combined with the air driven power generating system provides optimal conditions for energy conversion from air currents.

In its broadest aspects, the present invention is an omnidirectional air driven power generating system for employment in a structure which, when exposed to wind, causes the formation of higher than ambient atmospheric pressures in a space adjacent to one surface of the structure and lower than ambient atmospheric pressures in a space adjacent to another, generally opposed surface of the structure. A hollow housing has an internal partition mounted therein so as to divide the interior volume of the housing into two separated cavities. The partition has an orifice therethrough whereby air can move from one cavity to the other. An air driven power converter is mounted within and generally fills the orifice in the partition so that air moving through any part of the opening drives the converter. Means are provided for connecting a different one of the two separated cavities to a different one of the spaces adjacent to the surfaces of the structure so that a pressure differential can be produced between the two cavities thereby producing a flow of air through the orifice to drive the power converter. Means are also provided for switching the connections between cavities and spaces adjacent to the surfaces of the structure in response to a reversal of pressure polarity caused by a shift in wind direction so that the polarity of the pressure differential across the partition remains constant.

These and other objects, advantages and features of the invention will be apparent from the following detailed description of the invention taken together with the accompanying drawing.

BRIEF DISCUSSION OF THE DRAWING

In the Drawing;

FIG. 1 is a schematic side elevation view of a preferred structure having an omnidirectional air driven power generating system according to the invention incorporated therein; the Figure also contains, in schematic form, air current information which is useful for understanding the operation of the invention, FIG. 2 is a cross-sectional side elevation view of the omnidirectional air driven power generating system shown in FIG. 1, FIGS. 3 and 4 are schematic plan diagrams which are useful for explaining the operation of the invention under various wind direction conditions, and FIG. 5 is a schematic isometric view of a structure, such as a house, having the omnidirectional power generating system according to the present invention incorporated therein.

DETAILED DESCRIPTION OF THE PREFERRED EMBODIMENTS

Figure 1:
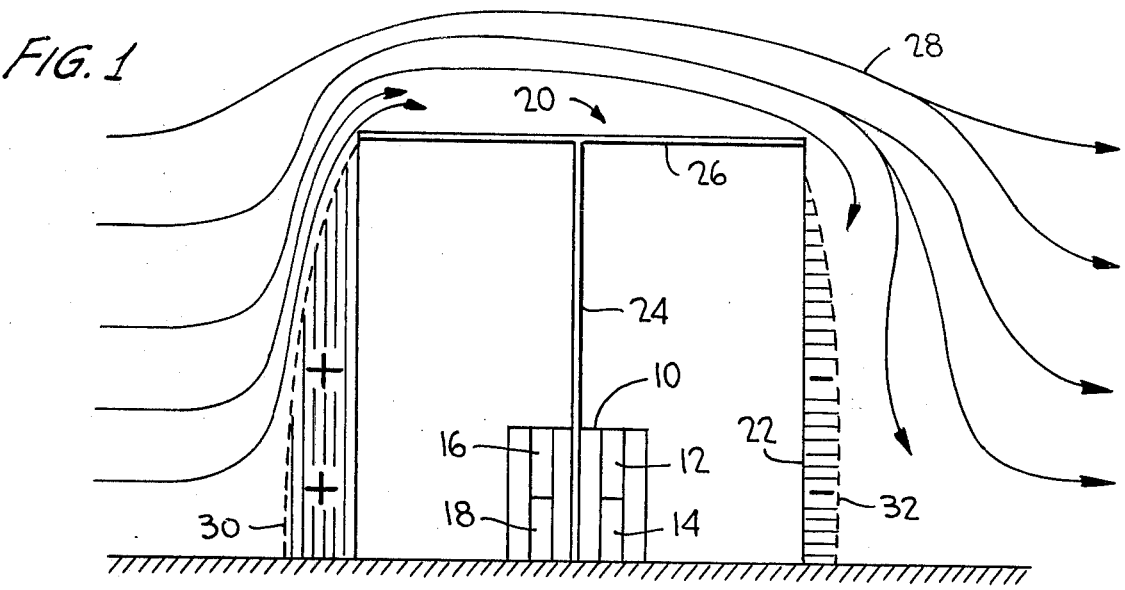

In referring to the various views in the drawing herebelow, like reference numerals will be utilized to refer to identical parts of the apparatus.

The omnidirectional air driven power generating system according to the present invention which is described in detail herebelow employs an air driven rotor of practical proportions for power conversion. This is accomplished by enclosing the rotors in a conditioned environment and by the employment of deflecting surfaces of generally unlimited size. These deflecting surfaces may be present on previously existing permanent structure, are free of all considerations of weight, wind alignment and extremes of weather. Since relatively vast deflecting surfaces may be and preferably are employed, usable quantities of kinetic energy may be recovered from wind currents which would previously have been considered prohibitively slow. Conversely, since the air driven power converter unit is enclosed within a structure, provision may be made to bypass overpressures so that lucrative operation of the system may be continued through periods of weather conditions which were previously considered disastrous for conventional windmill power generating systems.

Referring initially to FIG. 1, an omnidirectional air driven power generating system according to the present invention is indicated by the reference numeral 10. The system 10 includes a pair of oppositely biased unidirectional air flow valves 12 and 14 on one face and a similar set of unidirectional air flow valves 16 and 18 on a second face. Other sides or faces of the system 10 which are not shown in FIG. 1 have similar sets of oppositely biased unidirectional air flow valves therein. The operation of these individual elements will be explained in greater detail hereinbelow.

To derive benefit from extended periods of marginally slow wind conditions, preferred embodiments of the power generating system of the present invention employ a large structure such as is indicated generally by the reference numeral 20 in FIG. 1. The structure shown in FIG. 1 is comprised of two generally orthogonally intersecting walls 22 and 24 and an overlying horizontal surface 26. The structure 20 is specifically designed to present a large relatively uniform frontal area to a wind from any direction to encourage the creation of usable pressure differentials across the various surfaces.

The silhouette or projected frontal area of a more conventional existing structure, such as a house, viewed from any direction of the compass is likely to be many times greater than that of a conventional wind mill. It is this frontal area which determines the volume and mass of the air current which would be diverted by that structure when a given wind current is incident thereon. The depth of the volume of air of higher than ambient pressure which such a frontal area creates depends upon the velocity of the air mass incident on that frontal area and the angle through which it is diverted. The absolute pressure is, of course, generally highest directly adjacent to the surface. Obviously, a vertical wall generally orthogonal to an air current produces a greater pressure condition than a house of similar frontal area.

Conversely, on the opposite side of the structure from the frontal area, a volume of air is found adjacent thereto which is at less than ambient air pressure. The lowest air pressures are found near to the surface of the structure on the side opposite to the frontal area.

The curved lines in FIG. 1 which are denoted by the reference numeral 28 indicate the paths of the air currents as they are incident upon and diverted around the structure 20. As discussed above, these currents cause the generation of a volume of air against the frontal surfaces of the structure 20 on the side upon which the air flow is incident in which the pressure is higher than surrounding atmospheric pressure. The limits of such an area are denoted by the dotted line 30 enclosing a space in which plus signs (+) schematically represent the high pressure area. Conversely, on the opposite side of the structure 20 as the wind currents tend to sweep away from the structure, a volume of air is created the extent of which is denoted schematically by the reference numeral 32 wherein an air pressure lower than the ambient atmospheric pressure is produced. Here the negative signs (−) indicate a lower than ambient atmospheric air pressure.

A pressure differential is thereby established between the volumes 30 and 32 which is equal to the sum of the positive and negative pressure differentials previously discussed. The highest pressure differential is that found on opposite sides of the surfaces of the structure 20. It is this pressure differential which is utilized efficiently in the functioning of the invention of the present patent application.

Figure 2:
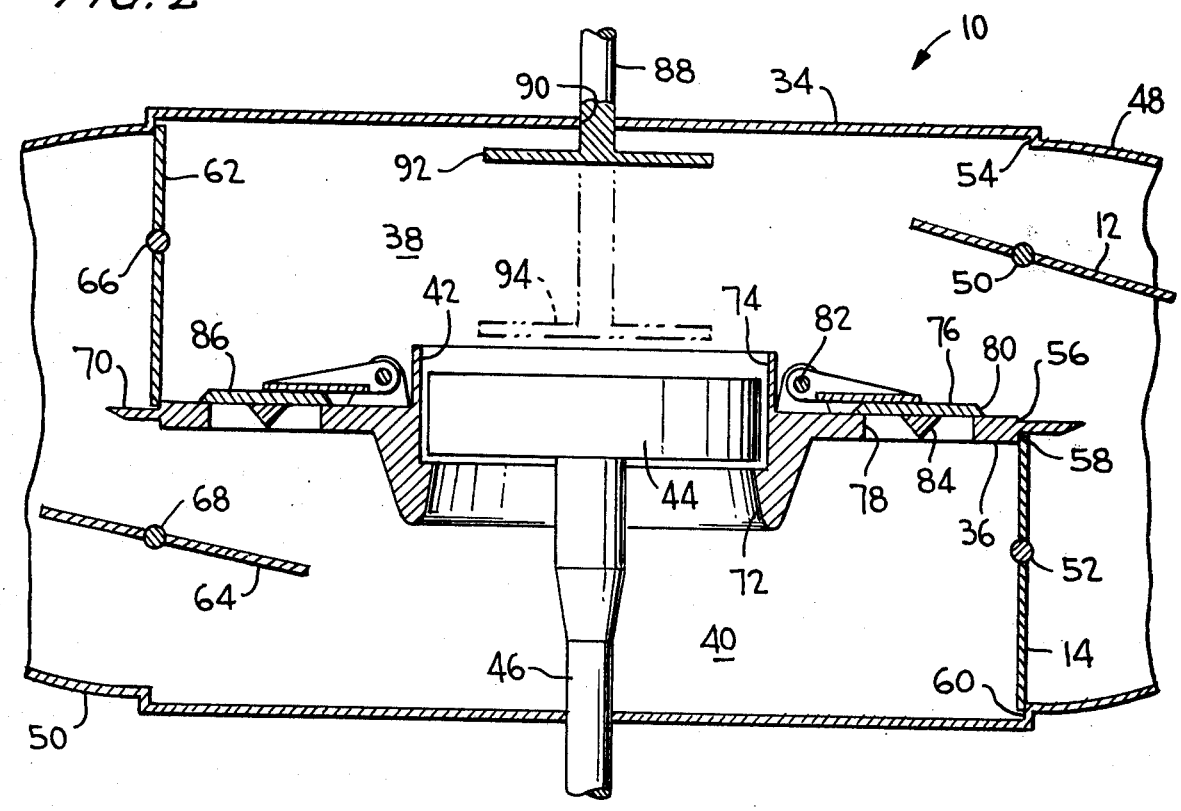

Referring now to FIG. 2 of the drawing, an enlarged cross-sectional view of a preferred embodiment of the omnidirectional air driven power generating system 10 according to the present invention is shown. The system 10 is enclosed in an outer hollow housing 34 which has an internal partition 36 mounted therein which divides the interior volume of the housing 34 into two separated cavities 38 and 40. The partition 36 has an orifice 42 through it, preferably centrally located in the partition, so that air can move from one of the cavities to the other. An air driven power converter unit 44 is mounted within and generally fills the orifice 42 in the partition 36 so that any air moving through any portion of the orifice drives the converter 44.

The air driven power converter 44 may be of any conventional type which is capable of converting the kinetic energy within a moving stream of air into another more readily usable form, whether mechanical, electrical or otherwise. Conventionally, such a device causes the rotation of a shaft, such as is shown at 46, which in turn is connected to an external rotational electrical generating unit which is not shown in this Figure.

On opposite ends of the housing 34, bell-shaped inlet and/or outlet ducts 48 and 50 are located. Within the openings at the proximal end of each of these ducts, a pair of one way valves, such as 12 and 14 in duct 48 are located. One of the valves, in this case 12, is forced to open by the existence of a higher pressure within the cavity 38 than in the duct 48. Therefore, valve 12 allows for the exit of air from the cavity 38 to the duct 48. The valve 12 does not allow incoming air in duct 48 to enter the cavity 38 since this presupposes that the air pressure in the duct 48 is higher than in the cavity 38. On the other hand, the other valve 14 which opens into the lower cavity 40 is oppositely biased. Incoming air within the duct 48 forces open the valve 14; however, air moving within the cavity 40 can not open the valve 14.

In this embodiment, the unidirectional air flow valves are constructed by pivoting a valve plate 12 or 14 about an excentric pivot point 50 or 52 respectively. Cooperating lips 54 and 56 are in the housing 34 and central partition 36 assist in preventing the valve plate 12 from opening in response to an elevation in air pressure on the inlet side thereof. Similarly, cooperating lips 58 and 60 serve to allow the valve plate 14 to open only when a positive pressure is applied to the inlet side thereof in the duct 48. Similar arrangements are provided for valves 62 and 64 which are located in the proximal end of the opposite duct 50. Valve plates 62 and 64 pivot about points 66 and 68 respectively. Although not shown in this Figure for clarity, additional similar valve arrangements are preferably provided in another, generally orthogonal direction so that alterations in wind direction merely alter the specific ducts and valves in use.

Hence, it may be seen that if an incoming stream of air is directed through the duct 50, the lower valve plate 64 is forced open thereby allowing the stream to enter into the lower cavity 40. The stream is then channelled through the orifice 42 thereby driving the converter unit 44. The air stream after entering the upper cavity 38 exits therefrom by rotating the valve plate 12 open about its pivot point 50 and exiting from the system 10 via the outlet duct 48.

Conversely, if the air flow direction outside the system 10 is reversed, the inlet stream of air enters the system 10 through the duct 48, passes through the valve 14 into the lower cavity 40, exits therefrom through the orifice 42 into the upper cavity 38, and is ducted out of the system through the valve 62 and the duct 50. Therefore, regardless of the direction of the incoming stream of air to the system 10, it is allowed to enter the system 10 by admittance to only a single one of the two cavities, in this case the lower cavity 40, and to exit only from the other one of the cavities. This allows the direction of the flow of the stream of air through the orifice 42 to be maintained constant regardless of the direction of the incoming stream of air. This greatly simplifies the means for converting the kinetic energy within that stream of air to usable energy. No means are necessary for converting from a reversible direction of rotation of the output shaft 46 since that direction remains constant at all times.

The middle partition 36 has a lip 70 thereon which protrudes for a short distance into each of the individual ducts 48 and 50 adjacent to the opening of the respective inlet valves 14 and 64. The lower surface of the protruding lips 70 is tapered so as to channel the incoming stream of air into the opening of the inlet valve. For similar reasons, the orifice 42 in the partition 36 is formed with a downwardly facing bell-shaped lip 72 and an upwardly extending throat 74 to optimize flow conditions through the orifice 42 and the air driven power converter unit 44 mounted therein so that flow conditions are optimized throughout the system 10.

On occasion, such as in high wind velocity conditions, an overpressure condition can be achieved within the system 10. Such an overpressure condition could easily damage the converter unit 44. Therefore, preferably means are provided for relieving the overpressure conditions within the system 10. A relief valve, such as shown at 76, is mounted in another orifice 78 within the center partition 36. In the embodiment shown in FIG. 2, the relief valve 76 is formed by a cover plate 80 which is hingedly affixed to the middle partition 36 and is rotatable about a pivot point 82. A weight 84 is affixed to the cover plate 80 to bias the plate into a closed position at those pressure conditions whereby the pressure relieving function is not required. A similar result may be achieved by means of various detents, springs and the like. A second such relief valve is shown at 86. The major consideration in having more than one relief valve is such that means be available for relieving overpressure conditions regardless of the direction of flow of the air stream within the cavity 40.

In preferred embodiments of the present invention, there is further included means for optimizing air flow through the orifice 42 under low pressure differential conditions. The embodiment shown in FIG. 2 illustrates such a device in schematic form. The means is comprised of a piston-like member 88 which is mounted for reciprocating movement through a hole 90 in the upper surface of the housing 34. The piston 88 includes on its distal end a disc 92 whose diameter is somewhat less than the diameter of the orifice 42. The piston 88 is able to reciprocate between the position shown in solid lines in FIG. 2 and the position 94 shown in dotted lines adjacent to the outlet of the orifice 42.

The disc member 92 is translated toward and away from the orifice 42 as the pressure differential between the cavities 38 and 40 decreases or increases, respectively. In this manner, at low pressure differential conditions, the air flow through the orifice is largely confined to a outer annular portion thereof. It is this outer annular portion which is generally the portion at which such air driven power generating units operate most efficiently. Therefore, the efficiency of the system is maintained at an optimally high level regardless of the presence of low pressure differential conditions.

The disc 92 may be moved toward and away from the orifice manually or it may be moved in response to a servo system which senses the pressure differential across the orifice and operates the disc 92 automatically so as to optimize flow conditions at all pressure differentials. Another means for achieving the relative displacement of the disc 92 is to utilize a sealed bellows unit one face of which is attached to a wall of the housing unit. The bellows unit then directly senses the pressure level in its associated chamber and positions the disc member 92 accordingly.

While the foregoing description of the embodiment shown in FIG. 2 of the drawing utilizes the lower cavity as the high pressure side of the orifice, it is clear that either of the cavities may be so utilized. The sole limitation is that the cavity selected as the inlet cavity must remain so at all times regardless of the direction of the incoming air stream to that cavity. Similarly, the cavity on the output side of the orifice must remain constant in order for the omnidirectional feature of the invention to be realized.

Figure 3:
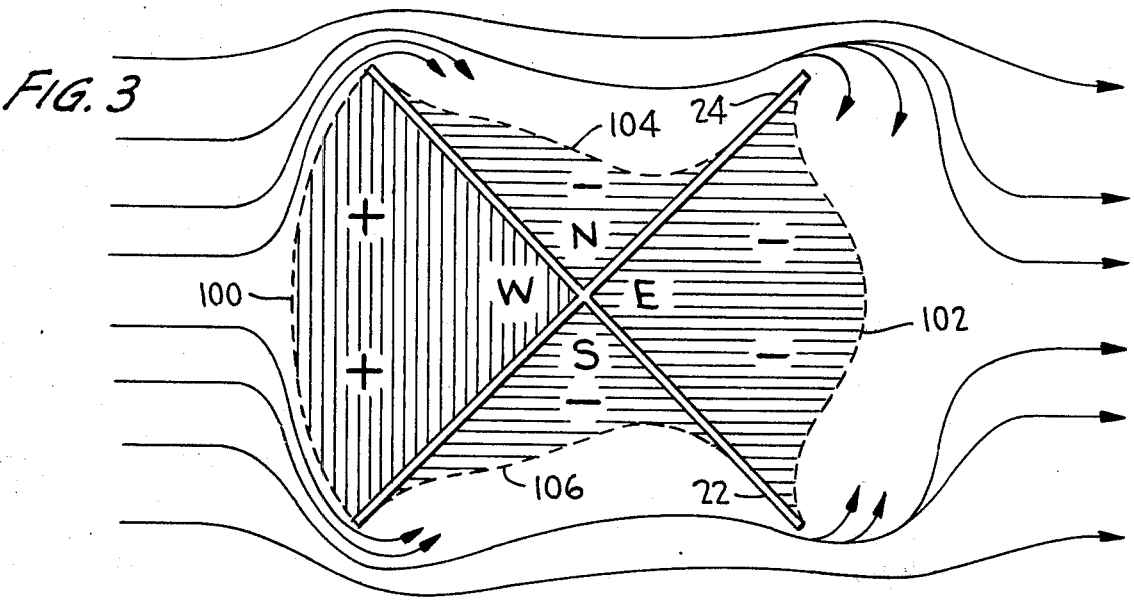
Figure 4:
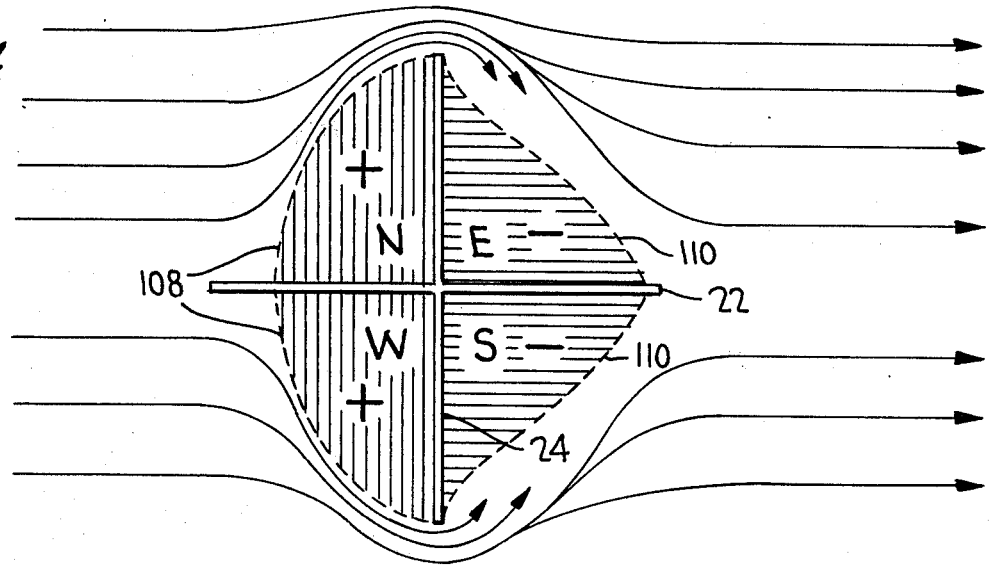

Turning now to FIG. 3, there is illustrated the pressure conditions which are generated by deflection of a wind current which is striking the cruciform structure 20 shown in side elevation view in FIG. 1 from a direction which is approximately 45° away from either of the upright walls 22 and 24. The cardinal points of the compass are included in this and the succeeding view of the drawing for illustrative purposes only. FIGS. 3 and 4 shown the cruciform structure of FIG. 1 with the top 26 having been removed for simplicity of structure.

When wind direction is from the West as shown in FIG. 3, a single positive pressure volume of air 100 is formed in the West quadrant into which the wind current is directed. On the other hand, the opposite or East quadrant is filled with a volume of air which is at a negative pressure with respect to ambient. This is denoted by the dotted line 102. In addition, the North and South quadrants are also partially filled with volumes of negatively pressurized air 104 and 106, respectively. The shape of the dotted line in each of the quadrants is representative of the degree of positive or negative pressurization which occurs in the respective quadrants of the cruciform structure 20. The volumes 104 and 106 in the North and South quadrants are smaller and the differential from ambient atmospheric less than for the volume 102 in the East quadrant.

When an omnidirectional power generating system 10 as shown in FIG. 2 is mounted at the intersection of the walls 22 and 24, preferably at the bases thereof as shown in FIG. 1, the pressure differential conditions which are created by the structure 20 may be utilized to drive the power generating system. In this arrangement, a suitable pair of associated inlet and outlet ports is directed into each of the four quadrants. Obviously, if the structure were to contain any additional sectors, associated ports in the system would be directed as well toward each such sector.

When wind direction is as shown in FIG. 3, the only inlet port which is open is that associated with the West quadrant. The outlet port is open in each of the North, East and South quadrants so that air is taken into the system through the inlet port associated with the West quadrant and exhausted proportionally to the other three quadrants. The North and South quadrants in this arrangement are not so productive as East quadrant since the depth of the pressurized volume is not so great.

When the wind direction is rotated clockwise through a 45 degree angle to the position shown in FIG. 4, a new pressure pattern is developed. In this instance, the quadrants denoted North and West are both positively and equally pressurized as shown by the dotted line 108. Conversely, the East and South quadrants are equally negatively pressurized as shown by the dotted lines 110. Under this wind condition, the inlet ports associated with the North and West quadrants open in the system 10 and the ports associated with East and South quadrants are open on the exhaust side.

Therefore, as the wind current direction varies through all points of the compass, there is a cyclical transition between the patterns of pressurization shown in FIG. 3 and those of FIG. 4. It is, therefore, obvious that the system when mounted in the structure 20 is capable of generating usable pressure patterns regardless of wind direction relative to the cruciform structure 20.

Taps near the center of the cruciform structure 20 are able to receive pressure from all quadrants of like polarity. The summation of the volumes in positively pressurized quadrants is then compared to the summation of the volumes of negatively pressurized air to ascertain the overall capability of the system 10. It will, therefore, be seen that a small volume near the center of the structure, is always subjected to a pressure differential during the flow of a wind from any direction of the compass and at any wind velocity.

The pressure differentials thus created represent potential energy whose values are a function of the kinetic energy expended against the structure by a wind current during its deflection by the structure. The absolute pressure changes involved are obviously small being at most a fraction of an atmosphere. However, the mass flow rates available may be very large depending largely upon the size of the deflecting surface 20. Therefore, if that mass flow rate is directed through an orifice of a suitable cross-sectional area so as not to exhaust the pressure differential, that flow rate will sustain a single high velocity air current therethrough which is well suited to driving an air driven power converter. For given wind velocity, the larger the surfaces of the deflecting structure, the larger the mass flow rate available; hence, the larger the rotor diameter which may be economically employed. In the extreme, very large surfaces, such as those of cliffs, may be utilized and may enable the employment of a plurality of generating systems in order to maintain rotor diameters within the practical confines which were discussed earlier with respect to conventional windmill structures.

Figure 5:
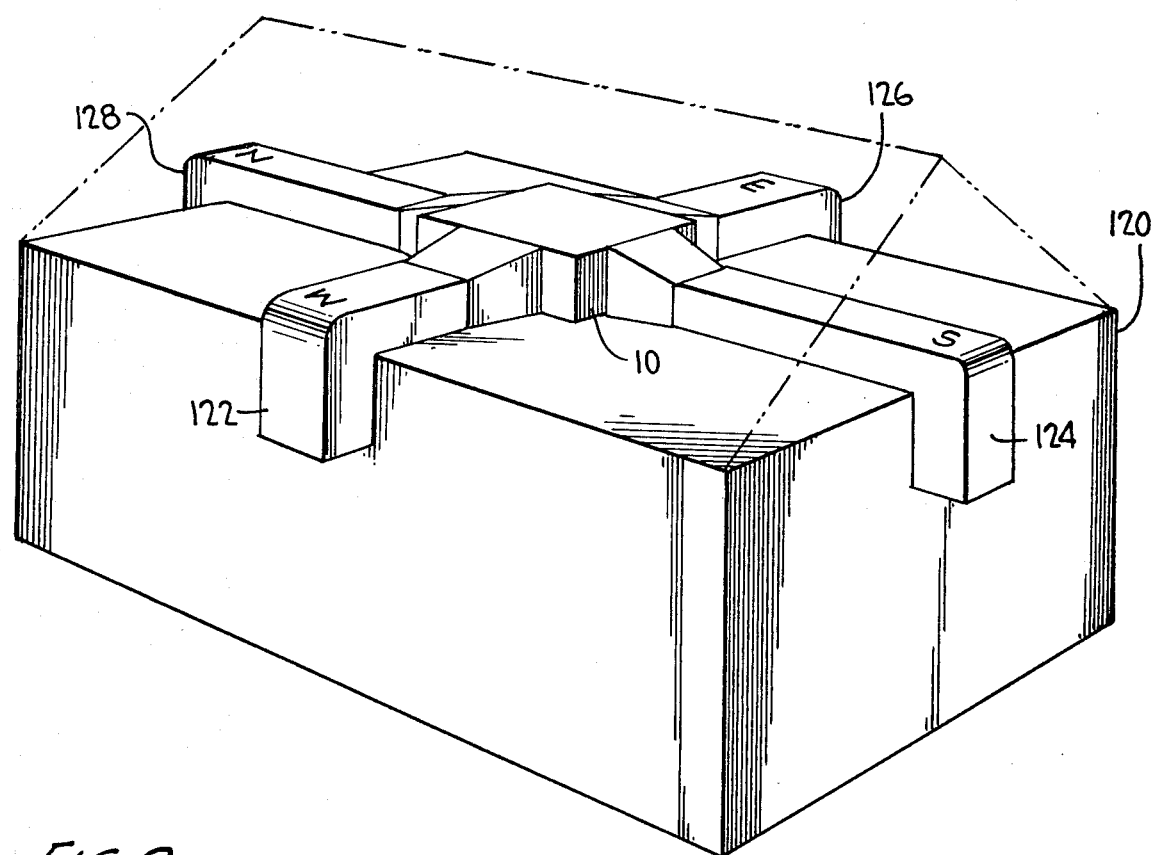

FIG. 5 represents a schematic presentation of the present invention embodied within a somewhat more conventional structure, such as a house 120. The house 120 has contours which offer no particular encouragement to the generation of useful pressure differentials beyond the fact that the house has finite volume, hence, a significant frontal area. The majority of houses have architectural features such as eaves, multiple stories, angled extensions and the like which delay the onset of laminar flow conditions around the structure with the resulting neutralization of pressures. When using a structure such as a house 120, the omnidirectional power generating system 10 is preferably centrally located and has a plurality, generally four, sets of ports thereon which are connected to the exterior of the structure by a like plurality of ducts. In this case, the ducts associated with reference numerals 122, 124, 126 and 128 face the West, South, East and North directions, respectively, around the structure of the house 120. In the absence of eaves, the distal openings of the ducts are extended downwardly to provide them access to the point of maximum pressure change on each wall.

In a similar manner, the system 10 may be housed in a church, a barn, or in a mountain ridge. The larger the surfaces which are utilized to deflect the winds incident thereon and the more perpendicular the surface to the wind, the larger the quantity of energy that is recoverable through the system of the present invention.

Preferably, the structure in which the system 10 is housed is one which is designed particularly for it such as the structure shown in FIGS. 1, 3 and 4. That structure is of particular significance for the present invention in that it has no size limitations and may be formed of any convenient material which is available and which is resistant to the weather extremes within the particular environment where the structure is located. It may be collapsed and transported to remote locations such as mountain peaks and it may be assembled in any given size.

While there have been shown and described what are considered to be preferred embodiments of the present invention, it will be obvious to those of ordinary skill in the art that various changes and modifications may be made therein without departing from the spirit of the invention as defined in the appended claims.

I claim:

1. An omnidirectional air driven power generating system for emplacement in a structure which, when exposed to wind, causes the formation of higher than ambient atmospheric pressures in a space adjacent to one surface of the structure and lower than ambient atmospheric pressures in a space adjacent to another, generally opposed surface of the structure, the system comprising a hollow housing having an internal partition mounted therein so as to divide the interior volume of the housing into two separated cavities, the partition having an orifice therethrough whereby air can move from one cavity to the other, an air driven power converter mounted within and generally filling the orifice in the partition so that air moving through any portion of the orifice drives the converter, means for connecting a different one of the two separated cavities to a different one of the spaces adjacent to the surfaces of the structure so that a pressure differential can be produced between the two cavities thereby producing a flow of air through the orifice to drive the power converter, and means for switching the connections between cavities and spaces adjacent to the surfaces of the structure in response to a reversal of pressure polarity caused by a shift in wind direction so that the polarity of the pressure differential across the partition remains constant.

2. The omnidirectional air driven power generating system according to claim 1, wherein the means for connecting are a plurality of ducts connected at their proximal ends to the housing and at their distal ends to the respective surfaces on the structure.

3. The omnidirectional air driven power generating system according to claim 2, wherein the housing has a pair of openings therethrough associated with and encircled by the proximal end of each duct, one of each pair of openings being in each of the two separated cavities, and wherein an unidirectional air flow valve is mounted within each of the openings in the housing, the flow direction of all of the valves associated with one of the cavities being inward and the flow direction of all of the valves associated with other of the cavities being outward.

4. The omnidirectional air driven power generating system according to claim 3, wherein each of the omnidirection air flow valves includes a valve plate excentrically pivoted in its opening and a stop at the edge of the opening.

5. The omnidirectional air driven power generating system according to claim 3, wherein there are four generally orthogonally directed ducts each connecting a different surface of the structure to the housing.

6. The omnidirectional air driven power generating system according to claim 5, wherein the structure comprises a generally vertically extended cruciform tower whose horizontal dimensions are such that, for any wind direction and normal wind velocity for the environment where the structure is erected, a volume of higher than ambient pressure air is formed which is sufficient to provide optimal air flow through the orifice between the cavities for the air driven power conversion device, and wherein the distal ends of the ducts are generally at the apexes of the cruciform tower.

7. The omnidirectional air driven power generating system according to claim 5, wherein there is further included means for relieving overpressures across the orifice at higher than normal wind velocities.

8. The omnidirectional air driven power generating system according to claim 7, wherein the means for relieving overpressure is a relief valve disposed in the partition between the cavities.

9. The omnidirectional air driven power generating system according to claim 8, wherein the relief valve includes a valve plate pivotably mounted in a second orifice in the partition, a stop at the edge of the orifice and a preselected biasing means for preventing the relief valve from opening until an overpressure occurs.

10. The omnidirectional air driven power generating system according to claim 5, wherein there is further included means for directing air flow through the orifice so that the flow past the air driven power converter is generally normal to the partition.

11. The omnidirectional air driven power generating system according to claim 10, wherein there is further included means for optimizing air flow through the orifice under low pressure differential conditions.

12. The omnidirectional air driven power generating system according to claim 11, wherein the means for directing air flow through the orifice includes a belled inlet airflow aligning member surrounding the orifice in the cavity at higher than ambient pressure and a generally cylindrical sleeve surrounding the orifice in the cavity at lower than ambient pressure.

13. The omnidirectional air driven power generating system according to claim 12, wherein the means for optimizing air flow includes a disc of lesser area than the orifice disposed generally parallel to the partition and means for translating the disc toward and away from the orifice as the pressure differential decreases or increases respectively so that at low pressure differential conditions the air flow is largely confined to an annular portion of the orifice.

14. The omnidirectional air driven power generating system according to claim 5, wherein the partition lies generally horizontally within the housing and the volumes of the two separated cavities are approximately equal.

* * * * *